United States Patent
Tanaka (10) Patent No.: US 6,661,490 B2
(45) Date of Patent: Dec. 9, 2003

(54) ELECTRO-OPTICAL DEVICE AND ELECTRONIC APPARATUS

(75) Inventor: Chihiro Tanaka, Matsumoto (JP)

(73) Assignee: Seiko Epson Corporation (JP)

( * ) Notice: Subject to any disclaimer, the term of this patent is extended or adjusted under 35 U.S.C. 154(b) by 113 days.

(21) Appl. No.: 09/955,480

(22) Filed: Sep. 17, 2001

(65) Prior Publication Data

US 2002/0057410 A1 May 16, 2002

(30) Foreign Application Priority Data

Sep. 18, 2000 (JP) ........................................ 2000-282376

(51) Int. Cl.[7] ................................................. G02F 1/136
(52) U.S. Cl. ........................ 349/139; 349/151; 349/152; 349/155; 349/143; 349/153; 349/149; 349/150
(58) Field of Search .................... 349/139, 152, 349/151, 155, 106, 93, 94, 95, 96, 97, 192, 38, 39, 40

(56) References Cited

U.S. PATENT DOCUMENTS

| | | | |
|---|---|---|---|
| 5,285,301 A | * | 2/1994 | Shirahashi et al. ............ 359/59 |
| 5,619,358 A | * | 4/1997 | Tanaka et al. ............... 349/143 |
| 5,757,450 A | * | 5/1998 | Fujii et al. ................... 349/106 |
| 5,760,757 A | * | 6/1998 | Tanaka et al. ................ 345/93 |
| 5,914,763 A | * | 6/1999 | Fujii et al. ................... 349/149 |
| 5,940,064 A | * | 8/1999 | Kai et al. ..................... 345/173 |
| 6,091,466 A | * | 7/2000 | Kim et al. ..................... 349/43 |
| 6,172,732 B1 | * | 1/2001 | Hayakawa et al. ......... 349/152 |
| 6,384,878 B1 | * | 5/2002 | Kwak ........................... 349/40 |
| 2002/0101547 A1 | * | 8/2002 | Lee et al. ...................... 349/40 |

* cited by examiner

Primary Examiner—Nathan J. Flynn
Assistant Examiner—Fazli Erdem
(74) Attorney, Agent, or Firm—Harness, Dickey & Pierce, P.L.C.

(57) ABSTRACT

A dummy electrode 217 having an L-shape as a whole in plan view is formed on a surface of an element substrate 210 so that a dummy electrode unit 217*a* which is disposed on the side opposite to the side on which a scanning line 221 of a liquid crystal drive area S is formed outside the liquid crystal drive area S extending along and substantially parallel to a data line 211 is continuous to a dummy electrode 217*c* passing between a connection unit 211*a* of the data line 211 and an input terminal 213. The dummy electrode 217 is not formed on the scanning line 221 side of the liquid crystal drive area S.

9 Claims, 5 Drawing Sheets

ELECTRO-OPTICAL DEVICE AND ELECTRONIC APPARATUS

BACKGROUND OF THE INVENTION

1. Technical Field of the Invention

The present invention relates to an electro-optical device and an electronic apparatus, and more specifically, it relates to the technology suitable for a liquid crystal display device having an active element.

2. Description of the Related Art

Generally, a liquid crystal display panel constituting a liquid crystal display comprises a liquid crystal sealed between two substrates, a plurality of electrodes disposed on inner surfaces of the two substrates facing each other, and optical modulation modes according to the voltage applied between electrodes are realized for each pixel area formed of a pair of electrodes facing each other and the liquid crystal disposed therebetween.

The current mainstream liquid crystal display panels are active matrix liquid crystal display panels that produce the highest screen quality. In this active matrix liquid crystal display panel, a pixel electrode formed on each of the above pixel areas is connected to wires via an active element including a thin film transistor (TFT) and a thin film diode (TFD) having the non-linear current-voltage characteristic.

Some liquid crystal display panels have a semiconductor circuit to supply a predetermined electric potential to a plurality of electrodes in a liquid crystal sealed area formed on a substrate surface portion outside the liquid crystal sealed area that is sealed with a sealing material or the like. This semiconductor circuit is connected to an input terminal formed on a substrate end portion and a wire connected to the electrodes, and outputs a drive electric potential to a plurality of electrodes based on a power source electric potential and a control signal supplied to the input terminal. The semiconductor circuit comprises semiconductor ICs mounted on the surface of the substrates, or comprises a circuit pattern formed directly on the surface of the substrates using thin film deposition technology.

In the above active matrix liquid crystal display, a problem occurs, in that the active element easily causes a dielectric breakdown by the static electricity accumulated in a liquid crystal panel manufacturing process generally due to a low electrostatic withstand voltage of the active element, and thus the active element does not perform its function.

Figure 8:
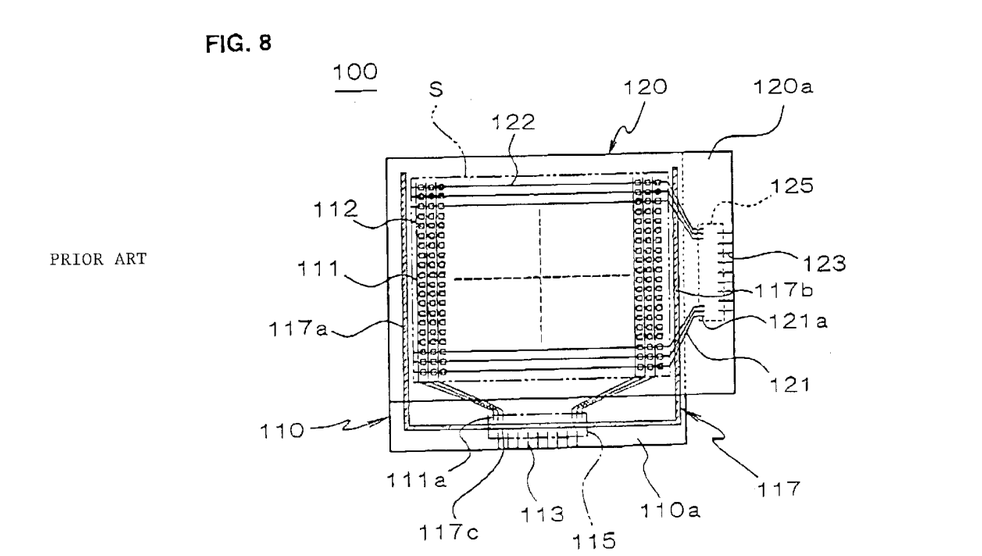
FIG. 8 is a plan perspective view of the structure of a conventional liquid crystal display panel.

FIG. 8 shows a liquid crystal display panel 100 having a structure to prevent the dielectric breakdown of the above active element. In this liquid crystal display panel 100, an element substrate 110 is bonded to an opposing substrate 120 via a sealing material not shown in the figure, and a liquid crystal is sealed inside the sealing material. A plurality of data lines 111 continuously disposed in a striped manner are formed on the surface of the element substrate 110, and a plurality of pixel electrodes 112 are respectively connected to the data lines 111 via a MIM element not shown in the figure (a diode (two-terminal) element) having a "metal-insulator-metal" structure with a non-linear current-voltage characteristic.

A substrate expansion portion 110a expanding from an outer edge portion of the opposing substrate 120 is disposed on the element substrate 110, the data line 111 is extended onto the surface of the substrate expansion portion 110a, and a connection portion 111a connected to a semiconductor IC 115 indicated by a one-dot chain line in the figure is disposed on a tip of the data line 111. A plurality of input terminals 113 are formed on the outer edge portion of the substrate expansion portion 110a, and the input terminal 113 is also connected to the semiconductor IC 115.

On the other hand, a plurality of scanning lines 121 disposed parallel to each other and a plurality of opposing electrodes 122 parallel to each other extending in a direction orthogonal to the data lines 111 and connected to these scanning lines 121 are disposed on the opposing substrate 120. The opposing electrode 122 is intersected with the pixel electrode, and the intersected portion forms the pixel area. An area with a plurality of pixel areas P shown in FIG. 9 arrayed in a matrix is referred to as a liquid crystal drive area S. A connection portion 125a disposed on the tip of the scanning line 121 is connected to the semiconductor IC 125 mounted on the substrate expansion portion 120a of the opposing substrate 120. A plurality of input terminals 123 connected to the above semiconductor IC 125 are formed on the outer edge portion of the substrate expansion portion 120a.

In this liquid crystal display panel 100, a dummy electrode 117 having a U-shape in plan view is disposed on the surface of the element substrate 110. The dummy electrode 117 comprises a pair of dummy electrode units 117a, 117b extending parallel to each data line 111 on both right and left sides of the liquid crystal drive area S, and a dummy electrode unit 117c passing between the connection portion 111a of the data line 111 and the input terminal 113. The dummy electrode 117 is integrally formed so that the dummy electrode portions 117a, 117b, 117c are connected to each other.

In this liquid crystal display panel 100, static electricity accumulated in the manufacturing process is transmitted along the dummy electrode 117 since the dummy electrode 117 is formed, and thus the static electricity is less easily transmitted to the data line 111, and thus the dielectric breakdown of the MIM element can be reduced.

Figure 9:
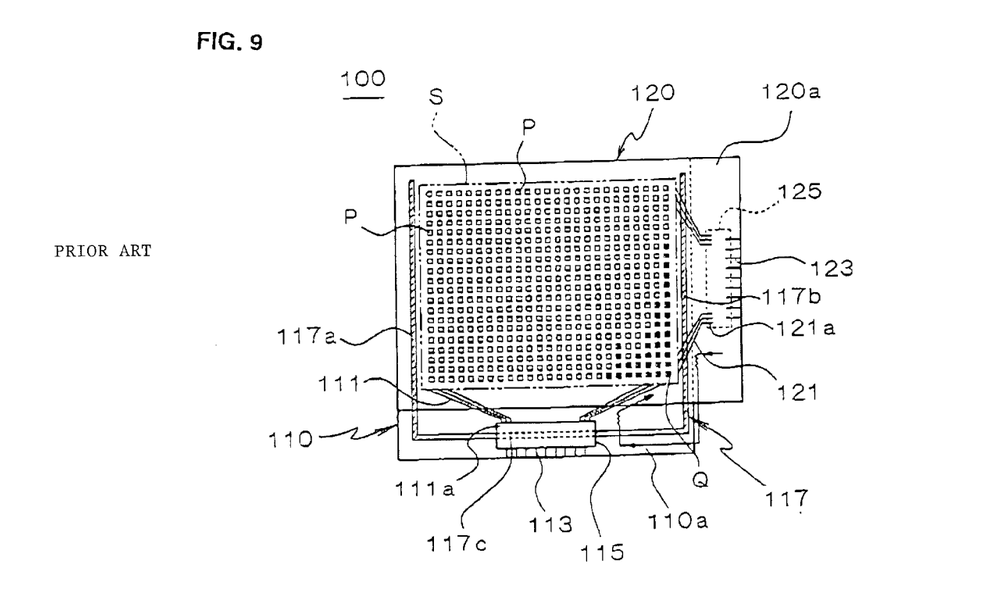
FIG. 9 is a schematic plan view of a pixel defect of the conventional liquid crystal display panel.

However, although the probability of a dielectric breakdown occurrence of the MIM element is reduced when the above dummy electrode 117 is formed, a pixel defect Q (a white defect attributable to a short circuit defect in a MIM element) can occur along the data line 111 on the dummy electrode unit 117b as shown in FIG. 9. This pixel defect Q occurs in a portion close to the dummy electrode unit 117c when viewed in the extending direction of the data line 111, and occurs in a more extensive range toward the opposite side of the dummy electrode unit 117c closer to the dummy electrode unit 117b. Such a pixel defect Q adversely affects the yield of the product because the defect cannot be discovered until a lighting inspection is carried out after the panel assembly process.

The present invention has been made in light of the above problems and the object of the present invention is to reduce the above pixel defects by providing an electro-optical device with countermeasures for the static electricity.

SUMMARY OF THE INVENTION

In order to solve the above problems, an electro-optical device according to the present invention comprises an electro-optical substance disposed between a first substrate and a second substrate, and is characterized in that the first substrate comprises a plurality of first wires extending in a predetermined direction, pixel electrodes connected to the first wires via an active element, an input terminal, and a semiconductor circuit connected to the first wires and the input terminal, the second substrate comprises opposing electrodes disposed facing the pixel electrodes and second wires connected to the opposing electrode at one side in a direction substantially orthogonal to the predetermined direction, an area where the pixel electrodes that face the opposing electrodes via the electro-optical substance is formed into a drive area, and the first substrate further comprises a dummy electrode having a dummy electrode unit extending along the first wires on the side opposite to the second wires in the drive area and a dummy electrode unit passing between the first wires and the input terminal formed continuously to each other.

The dummy electrode is not formed on the second wiring side of the drive area.

A second dummy electrode comprising a dummy electrode unit extending along the first wires on the second wire side of the drive area and a dummy electrode unit passing between the first wires and the input terminal formed continuously thereto is separated from the dummy electrode in the present invention, and the dummy electrode passing between the first wires and the input terminal in the second dummy electrode is preferably formed closer to the input terminal side than the dummy electrode unit passing between the first wires and the input terminal in the dummy electrode.

In the present invention, the second substrate preferably comprises a second input terminal and a second semiconductor circuit connected to the second wires and the second input terminal.

An electronic apparatus according to the present invention comprises the above electro-optical device.

In a conventional liquid crystal display panel shown in FIGS. 8 and 9, when static electricity is accumulated in the second wires, it is assumed that the active element connected to the first wires 111 is subjected to a dielectric breakdown by the charge path in which the discharge occurs from the second wires to the dummy electrode unit 117b facing thereto, a charge moves along the dummy electrode 117, and then the discharge occurs from the dummy electrode unit 117c of the dummy electrode 117 to the connection unit 111a of the first wires, and the above-described pixel defect thus occurs.

On the other hand, in the present invention, the second wires and the dummy electrode are not disposed opposite to each other on a peripheral portion on the second wires side of the drive area, and thus, no movement of charges along the charge path is made, and as a result, the probability of a dielectric breakdown occurrence in the active element is reduced and pixel defects are reduced.

Since the static electricity accumulated in the second wires can be discharged to the second dummy electrode disposed facing thereto by further providing a second dummy electrode in addition to the dummy electrode, the dielectric breakdown attributable to another charge path than the above one, for example, the direct discharge from the opposing electrode to the first wires or the pixel electrode can be reduced. The dummy electrode unit passing between the first wires and the input terminal in the second dummy electrode is disposed closer to the input terminal side than the dummy electrode unit passing between the first wires and the input terminal in the dummy electrode, and thus no discharge can occur between the first wires and the second dummy electrode.

DETAILED DESCRIPTION OF THE PREFERRED EMBODIMENTS

An electro-optical device and an electronic apparatus according to the present invention will be described in detail with reference to the attached drawings.

Figure 1:
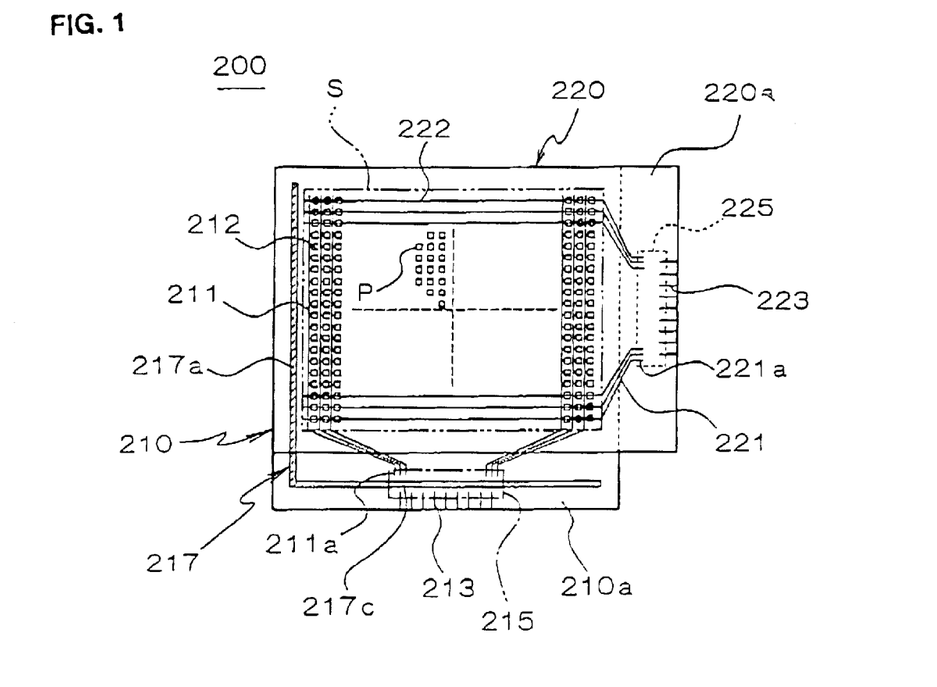
FIG. 1 is a plan perspective view of a plane structure of a liquid crystal display panel according to a first embodiment of an electro-optical device of the present invention.

FIG. 1 is a plan view of a liquid crystal display panel 200 according to the present embodiment. In this liquid crystal display panel 200, a transparent element substrate 210 and an opposing substrate 220 formed of glass or plastic are bonded to each other via a sealing material not shown in the figure, and a liquid crystal is poured inside the sealing material and sealed therein.

A plurality of data lines 211 formed of a metal such as Ta and extending in the vertical direction in the figure are continuously formed in a striped manner on a surface of the element substrate 210, and a plurality of pixel electrodes 212 formed of a transparent conductor including ITO (Indium Tin Oxide) are respectively connected to these data lines 211 via a MIM element which will be described below. The data lines 211 are extended so that they are drawn to a substrate expansion portion 210a, and their tip portions form connection units 211 a electrically connected to a bump electrode or the like of a semiconductor IC 215. A plurality of input terminals 213 facing the connection units 211a are formed on an outer edge portion of the substrate expansion portion 210a.

A substrate expansion portion 220a projecting to the side of a contour of the element substrate 210 is disposed on the opposing substrate 220. A plurality of scanning lines 221 having a connection portion 221a are disposed on the substrate expansion portion 220a. Further, a plurality of opposing electrodes 222 extending in the direction orthogonal to the data lines 211 and formed of a transparent conductor are disposed parallel to each other in a striped manner in a liquid crystal sealed area. The scanning lines 221 are connected to the corresponding opposing electrodes 222, respectively.

A plurality of input terminals 223 facing the connection units 221a of the scanning lines 221 are disposed on the substrate expansion unit 220a. A semiconductor IC 225 is electrically connected to the connection unit 221a and the input terminal 223.

The pixel electrode 212, and an area with the opposing electrode opposing thereto intersected with each other in the plan view (this means, an area formed of both electrode portions facing each other and the liquid crystal therebetween) forms a pixel area P, and a plurality of the pixel areas P are arrayed in a matrix to form a liquid crystal drive area S.

On the surface of the element substrate 210, a dummy electrode 217 is formed such that it is disposed in an area that is outside the liquid crystal drive area S and is opposite the side on which scanning lines 221 for the liquid crystal drive area S are formed, wherein the dummy electrode 217 comprises a dummy electrode unit 217a and a dummy electrode unit 217c formed in a continuous L shape as a whole in plan view, the dummy electrode unit 217a extending along and substantially parallel to the data lines 211, and the dummy electrode unit 217c passing between the connection unit 211a of the data line 211 and the input terminal 213. This dummy electrode 217 is not formed on the scanning line 221 side of the liquid crystal drive area S.

This dummy electrode 217 is preferably formed of the same material as that of the data lines 211 simultaneously with the data lines 211. The dummy electrode 217 is illustrated as one L-shaped pattern in the figure; however, it may be formed of a plurality of patterns separate from each other in the width direction. In this case, the width and the interval of a plurality of the patterns are preferably similar to those of the striped-shaped pattern of the data lines 211.

Figure 5:
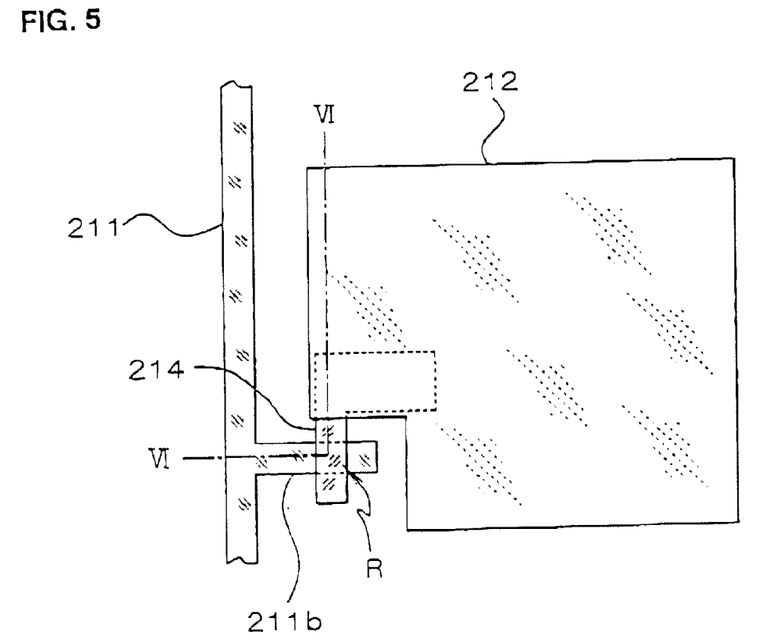
FIG. 5 is an enlarged plan view of a surface structure in one pixel area of the element substrate according to the first embodiment.
Figure 6:
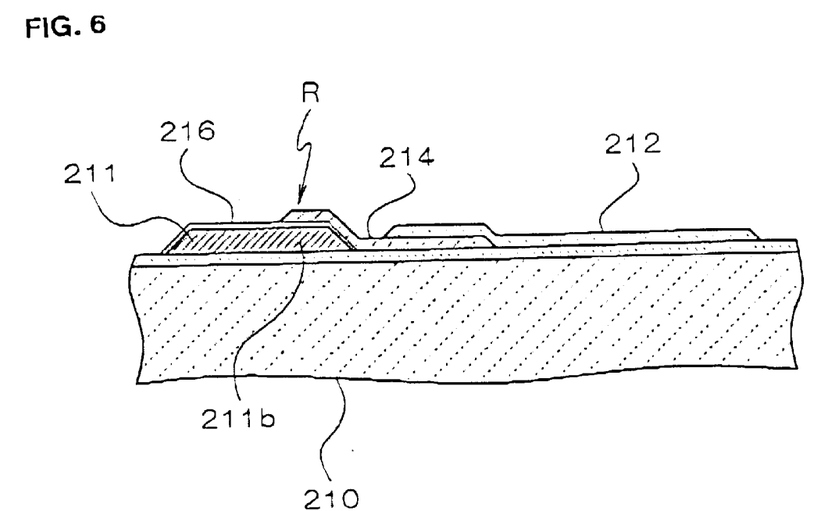
FIG. 6 is an enlarged cross-sectional view through the line VI—VI in FIG. 5.

FIG. 5 is an enlarged plan view showing a portion corresponding to one pixel area of the element substrate 210 according to the present embodiment, and FIG. 6 is an enlarged sectional view showing the section through the line VI—VI in FIG. 5. A thin film formed of tantalum oxide ($Ta_2O_5$) is formed on the substrate surface using a sputtering method or the like, and the data lines 211 are formed of Ta using the sputtering method, a photo-lithographic method or the like. The data lines 211 are patterned with a shape having a projecting portion 211b projecting to the side and provided on each pixel area P. Next, the surface of the data lines 211 is oxidized by an anode oxidizing method or the like, and a thin insulating film 216 (refer to FIG. 6) is formed on the surface of the data lines 211. In addition, an electrode layer 214 formed of Cr is formed so that a part thereof overlaps the projecting portion 211b. Finally, the above pixel electrode 212 is formed of a transparent conductor including ITO using the sputtering method, the photo-lithographic method or the like so that the pixel electrode overlaps a part of the electrode layer 214.

In this pattern structure, a MIM element R comprises the projecting portion 211b formed of Ta, an insulating film 216 formed of $Ta_2O_5$, and the electrode layer 214 formed of Cr. The MIM element is a two-terminal non-linear element having a nonlinear current-voltage characteristic in the presence of the insulating film 216.

Figure 2:
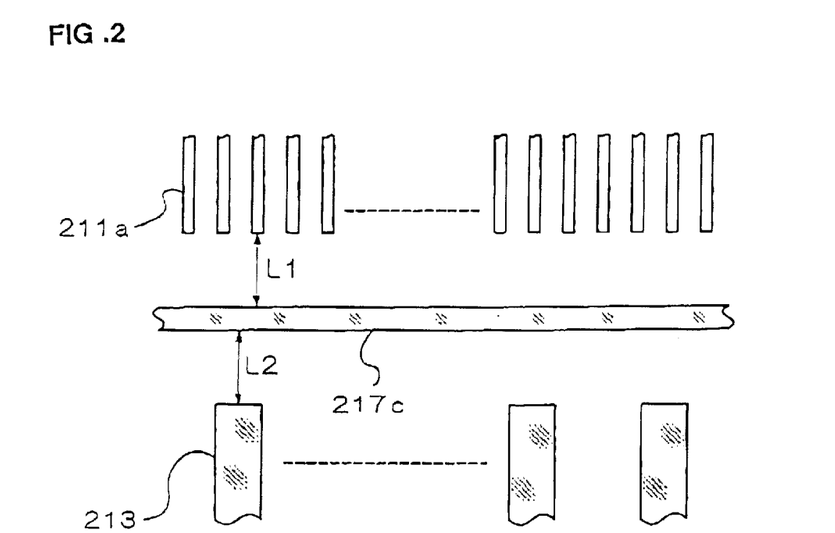
FIG. 2 is an enlarged plan view of a substrate expansion portion of an element substrate according to the first embodiment.

FIG. 2 shows a portion of the substrate expansion portion 210a in an expanded manner. The dummy electrode unit 217c of the dummy electrode 217 is extended between a connection unit 211a disposed on a tip of the data line 211 and the input terminal 213. The distance L1 from the dummy electrode unit 217c to the connection unit 211a is set to be substantially equal to the distance L2 from the dummy electrode unit 217c to an end of the input terminal 213 in the present embodiment.

The reason why the distance L1 is substantially equal to the distance L2 as described above is that the probability of a discharge occurrence between the dummy current 217 and the connection unit 211a, and between the dummy electrode 217 and the end of the input terminal 213 is minimized when the static electricity is accumulated in the dummy electrode 217.

In the state of the liquid crystal display panel 200 as illustrated in FIG. 1, even when the discharge occurs between the dummy electrode 217 and the input terminal 213, no dielectric breakdown of the MIM element occurs in the input terminal 213 since the MIM element is not connected to the input terminal 213. Thus, the distance L1 is preferably larger than the distance L2 in the state shown in the figure.

Figure 7:
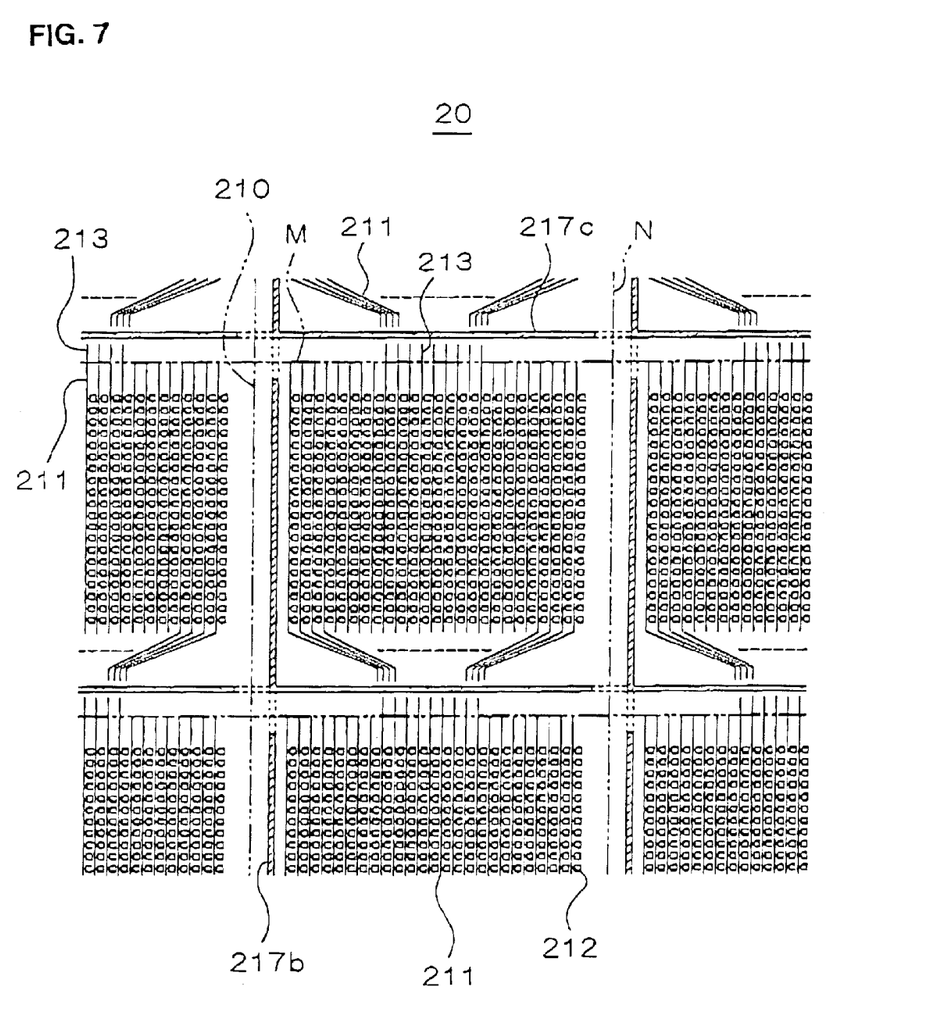
FIG. 7 is an enlarged plan view of a part of a surface structure in one base substrate (forming the element substrate) of a large panel in a manufacturing method to form the liquid crystal display panel by dividing the large panel.

However, when generally manufacturing a compact liquid crystal display panel, a large panel including a plurality of portions corresponding to panels is formed, and this large panel is divided to form a plurality of liquid crystal display panels 200. As shown in FIG. 7, wiring patterns formed on the element substrate 210 are formed continuous to each other in the vertical and right-to-left directions on the large base substrate 20 constituting the large panel, and thus the input terminal 213 belonging to one wiring pattern is formed to be continuous to one portion of the data line 211 belonging to the wiring pattern adjacent thereto at the bottom of the figure on this base substrate 20. In FIG. 7, the base substrate 20 is broken by division lines N, M when dividing the large panel to form the above element substrates 20.

In such a case, there is a possibility that a dielectric breakdown can occur in the MIM element connected to the data line 211 belonging to the wiring pattern that is continuous to and adjacent to the input terminal 213 even when the discharge occurs between the dummy electrode unit 217c and the input terminal 213. This means that the dielectric breakdown of the MIM element can occur even when the discharge occurs from the dummy electrode unit 217c into any of the data lines 211 and the input terminal 213 if a manufacturing process in which such a base substrate 20 is formed is employed. Thus, in order to prevent the dielectric breakdown from occurring before the large panel is divided, the distance L1 is preferably substantially equal to the distance L2 as described in the present embodiment.

Further, in the base substrate 20 shown in FIG. 7, as indicated by a broken line, the dummy electrodes 217 may be connected to each other between adjacent wiring patterns, and formed in a condition connected in a lattice shape.

The dummy electrode 217 according to the present embodiment is not formed on the side on which the scanning lines 221 of the liquid crystal drive area S are formed, and no portion facing thereto in the thickness direction of the substrate is present between the dummy electrode and the scanning lines 221, and thus, even when the static electricity is accumulated in the scanning lines 221, no charge moves (is discharged) to the dummy electrode 217, and as a result, the movement (discharge) of the charge from the dummy electrode 217 to the data lines 211 is also reduced. Thus, the dielectric breakdown of the MIM element attributable to the charge path moving from the scanning lines 221 to the data lines 211 via the dummy electrode 217 can be prevented, and the pixel defect Q shown in FIG. 9 does not occur.

Figure 3:
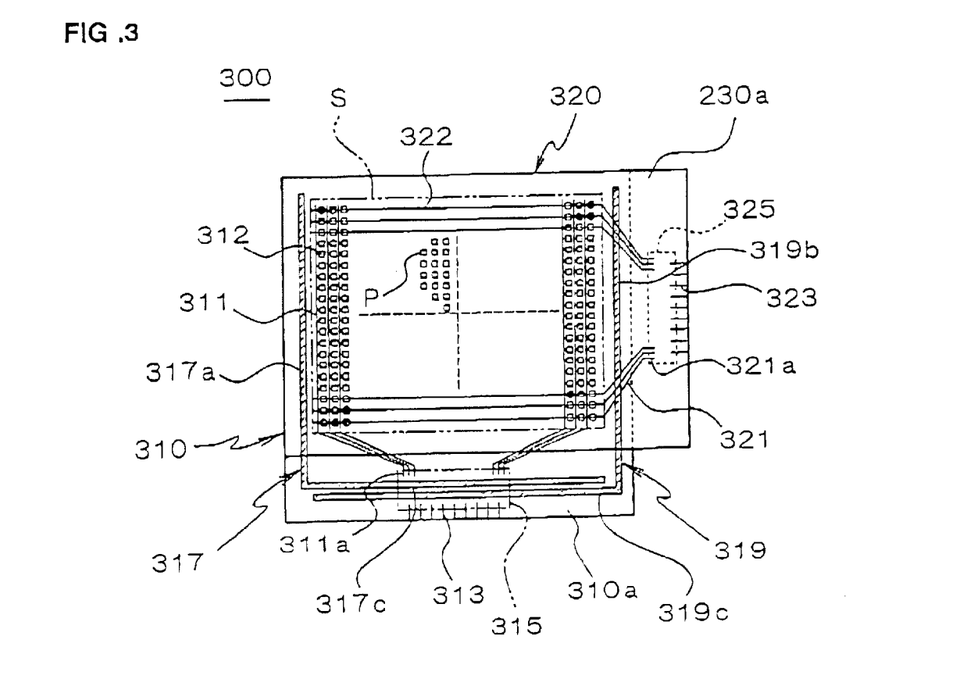
FIG. 3 is a plan perspective view of a plane structure of the liquid crystal display panel according to a second embodiment of an electro-optical device of the present invention.

Next, a liquid crystal display panel 300 according to a second embodiment of the present invention will be described with reference to FIG. 3. In this embodiment, the liquid crystal display panel comprises an element substrate 310 and an opposing substrate 320 which are similar to those according to the first embodiment. Further, similar to the first embodiment, data lines 311, pixel electrodes 312 and input terminals 313 are disposed on the element substrate 310, and a semiconductor IC 315 is mounted thereon. On the other hand, scanning lines 321, opposing electrodes 322 and input terminals 323 are formed on the opposing substrate 320, and a semiconductor IC 325 is mounted thereon.

Similar to the dummy electrode 217 according to the first embodiment, a substantially L-shaped first dummy electrode 317 comprising a dummy electrode unit 317a extending along the data lines 311 and substantially parallel to the data line 311 on the side opposite to the forming position of the scanning lines 321 with respect to the liquid crystal drive area S, and a dummy electrode unit 317c passing between the connection unit 311a of the data line 311 and the input terminal 313 is formed on the surface of the element substrate 310.

Still another second dummy electrode 319 is formed on the element substrate 310 according to the present embodiment in addition to the first dummy electrode 317. This second dummy electrode 319 comprises a dummy electrode unit 319b and a dummy electrode unit 319c formed in a continuous L-shape as a whole in plan view, the dummy electrode unit 319b extending along and substantially parallel to the data lines 311 on the forming side of the scanning lines 321 with respect to the liquid crystal drive area S, and the dummy electrode unit 319c passing between the connection 311a of the data lines 311 and the input terminal 313. The first dummy electrode 317 and the second dummy electrode 319 are formed such that they are isolated from each other, i.e., in an electrically non-contact condition.

The first dummy electrode 317 and the second dummy electrode 319 are adjacent to each other in the width direction at a portion passing between the connection unit 311a of the data lines 311 and the input terminal 313. The dummy electrode unit 317c and the dummy electrode unit 319c are spaced apart and from and substantially parallel to each other. At the adjacent portion of these electrode units, the dummy electrode unit 319c of the second dummy 319 is disposed closer to the input terminal 313 side than the dummy electrode unit 317c of the first dummy electrode unit 317.

Figure 4:
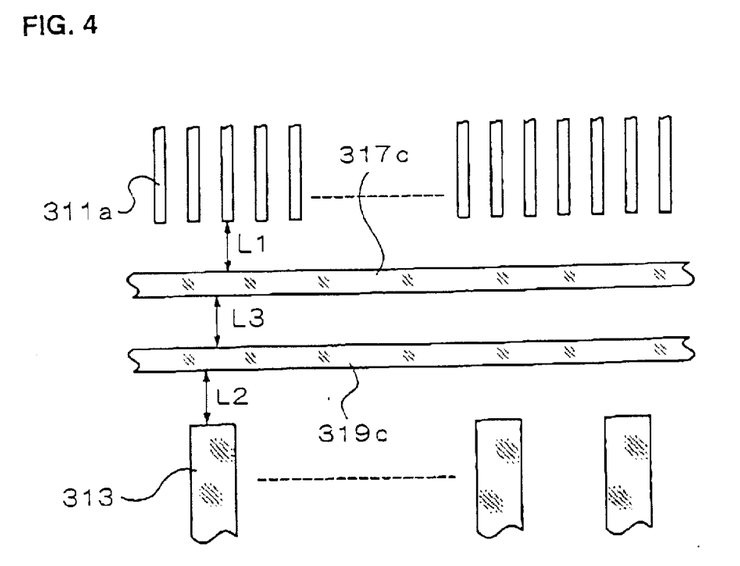
FIG. 4 is an enlarged plan view of a substrate expansion portion of an element substrate according to the second embodiment.

FIG. 4 shows an expanded portion of the substrate expansion portion 310a of the element substrate 310 in the above liquid crystal display panel 300. In the present embodiment, the distance L1 between the dummy electrode unit 317c and the connection unit 311a is set to be substantially equal to the distance L2 between the dummy electrode unit 319c and a tip of the input terminal 313, and the distance L3 between the dummy electrode unit 317c and the dummy electrode unit 319c is set to be smaller than the distances L1, L2.

The distance L1 is set to be substantially equal to the distance L2 because the probability of the discharge occurrence between the connection unit 311 and the dummy electrode unit 317a, and between the dummy electrode unit 319c and the input terminal 313 is minimized similar to the first embodiment. On the other hand, even when the discharge occurs between the dummy electrode unit 317c and the dummy electrode 319c, the discharge does not directly affect the data lines 311 or the input terminal 311, and thus the distance L3 is set to be smaller than the distances L1, L2. Since the distances L1, L2 can be increased accordingly by the reduction of the distance L3, the probability of the discharge occurrence in the data lines 311 and the input terminal 313 can be reduced.

In the present embodiment, the second dummy electrode 319 is provided with the dummy electrode unit 319b facing (intersecting with) the scanning line 321, and when the static electricity is accumulated in the scanning line 321, the discharge occurs between the scanning line 321 and the second dummy electrode 319, leaving the possibility that a charge moves to the second dummy electrode 319. However, the dummy electrode unit 319c of the second electrode 319 is disposed on the input terminal 313 side of the dummy electrode unit 317c of the first dummy electrode 317, and thus no direct discharge occurs between the second dummy electrode 319 and the data line 311, and thus the dielectric breakdown of the MIM element attributable to the charge of the second dummy electrode 319 rarely occurs in a state of an independent panel structure as shown in FIG. 3.

On the other hand, because the second dummy electrode 319 is formed in the present embodiment, when the scanning line 321 is charged and even if a charge moves to the opposing second dummy electrode 319 by the discharge, it is less likely that the charge will move further to the opposing electrode 322 by traveling through a portion that opposes the second dummy electrode 319 and the discharge will occur between the opposing electrode 322 and the pixel electrode 312 facing thereto, thereby damaging the MIM element by the charge that traveled to the pixel electrode 312. Thus, the pixel defects can be further reduced by the presence of the second dummy electrode 319.

The liquid crystal display panel according to the above embodiments constitutes a liquid crystal display in combination with a polarizer, a backlight or a frontlight, a case body or the like as necessary. The liquid crystal display is built for use in various kinds of electric apparatuses. The electronic apparatuses include a cellular phone, a pager, a TV set, a portable information terminal, a computer, and a navigation system.

The electro-optical devices and electronic apparatuses according to the present invention are not limited to the examples shown in the figures, but various kinds of modifications can be added as long as they do not depart from the object of the present invention.

For example, the above embodiments are related to the liquid crystal display, and the liquid crystal display panel built in the liquid crystal display is described. However, the present invention is not limited to the liquid crystal display, but can be similarly applied to electro-optical devices using various kinds of electro-optical substances such as an electroluminescence (EL) panel.

In any one of the above embodiments, the MIM element is used as an active element (a switching element), and not only the MIM element but also a TFT or other various kinds of elements can be used as the active element. Further, the panel structure need not be of a matrix type as the above embodiments, but a segment type panel structure or the like can be applied to electro-optical devices having an arbitrary pixel structure.

In addition, the above dummy electrode, first dummy electrode and second dummy electrode are formed in an L-shape outside the liquid crystal drive area, but they need not be necessarily formed in an L-shape. For example, the dummy electrode unit formed along the data lines outside the liquid crystal drive area need not be strictly parallel to the data lines, or the connection portion of the dummy electrode unit formed along the data lines to the dummy electrode unit passing between the data line and the input terminal may be extended in the direction inclined with respect to any one of both electrode units, or may be extended in a curve.

As described above, in the present invention, a second wire and a dummy electrode are not disposed opposite to each other at a peripheral portion of the second wiring side of the drive area, and no movement of charge along the above path occurs, and as a result, the probability of a dielectric breakdown occurrence in the active element is reduced, and the pixel defects can be reduced.

The entire disclosure of Japanese Patent Application No. 2000-282376 filed Sep. 18, 2000 is incorporated herein by reference.

What is claimed is:

1. An electro-optical device comprising:

an electro-optical substance disposed between a first substrate and a second substrate;

said first substrate including a plurality of first wires extending in a predetermined direction, pixel electrodes connected to said first wires via an active element, terminal, and a semiconductor circuit connected to said first wires and said terminal;

said second substrate including opposing electrodes disposed so as to oppose said pixel electrodes and a plurality of second wires connected to said opposing electrodes and provided on one side of said second substrate in a direction substantially orthogonal to said predetermined direction;

drive area where said pixel electrodes face said opposing electrodes via said electro-optical substance; and said first substrate further comprising a first dummy electrode, said first dummy electrode having a first dummy electrode unit extending along said first wires and being placed outside said drive area on the side opposite to said one side where said second wires are provided and a second dummy electrode unit passing between said first wires and said terminal, said first unit being formed continuously with said second unit and said one side being free of said first dummy electrode.

2. An electro-optical device according to claim 1, wherein said first substrate further comprises a second dummy electrode having a third dummy electrode unit extending along said first wires on said one side outside of said drive area and a fourth dummy electrode unit passing between said first wires and said terminal, said third dummy electrode unit and said fourth dummy electrode unit being formed continuously and separated from said first dummy electrode, and said fourth dummy electrode unit being formed closer to said terminal outside said second dummy electrode unit.

3. An electro-optical device according to claim 1, wherein said second substrate comprises a second input terminal and a second semiconductor circuit connected to said second wires and said second input terminal.

4. An electronic apparatus having an electro-optical device according to claim 1.

5. An electro-optical device comprising:

a first substrate having a substrate expansion portion;

a plurality of first wires formed on said first substrate;

pixel electrodes connected to said first wires;

a second substrate disposed opposite said first substrate;

a plurality of second wires formed on said second substrate;

opposing electrodes disposed opposite said pixel electrodes and connected to said second wires;

an electro-optical substance disposed between said first and second substrate;

a drive area where said pixel electrodes that face said opposing electrodes via said electro-optical substance is formed; and a first dummy electrode having a first dummy electrode unit extending along said first wires and being placed outside of said drive area on a side opposite said second wires and a second dummy electrode unit passing between said first wires and terminal, said second dummy electrode unit being formed continuously with said first dummy electrode unit and terminating at a free end on said substrate expansion portion.

6. The electro-optical device of claim 5 further comprising:

a third dummy electrode unit extending along said first wires outside said drive area on a side adjacent said second wires; and a fourth dummy electrode unit passing between said first wires and said terminal, said fourth dummy electrode unit being formed continuously with said third dummy electrode unit.

7. The electro-optical device of claim 6 wherein said fourth dummy electrode unit is formed closer to said terminal outside said second dummy electrode.

8. The electro-optical device of claim 1 wherein said first dummy electrode is L shaped.

9. The electro-optical device of claim 5 wherein said first and second dummy electrode units are formed continuously in an L shape.

* * * * *